United States Patent [19]

Cunningham

[11] 4,352,075
[45] Sep. 28, 1982

[54] SPLIT PHASE DELAY EQUALIZER WITH SINGLE TRANSFORMER AND ADJUSTMENT FOR Q LOSS

[75] Inventor: Vernon R. Cunningham, Melissa, Tex.

[73] Assignee: Rockwell International Corporation, El Segundo, Calif.

[21] Appl. No.: 214,300

[22] Filed: Dec. 8, 1980

[51] Int. Cl.³ .............................................. H03H 7/01
[52] U.S. Cl. .................................. 333/28 R; 333/138
[58] Field of Search .............. 333/28 R, 138; 330/151

[56] References Cited

U.S. PATENT DOCUMENTS

| | | | |
|---|---|---|---|
| 2,231,079 | 2/1941 | Longo | 333/138 |
| 3,551,854 | 12/1970 | Endo et al. | 333/28 R |
| 3,794,935 | 2/1974 | Tsuchiya et al. | 333/28 R |
| 3,868,604 | 2/1975 | Tongue | 333/28 R |
| 4,243,957 | 1/1981 | Schmidt | 333/28 R |

OTHER PUBLICATIONS

A. H. Naegeli, "IF Filters for the 8901A Modulation Analyzer", *Hewlett Packard Journal,* Nov. 1979, p. 10.
H. Shiki et al., "IF Variable Equalizers for FM Microwave Radio Links", *IEEE Transactions on Communications,* vol. COM-22,7, Jul. 1974, pp. 941-950.
V. Cunningham, "Design Single Section Delay Equalizers", *Electronic Design* 19, Sep. 13, 1976, pp. 82-87.
S. Rosenfield et al., "Group Delay Equalizaton in Communications Systems", *Comstron Application Data Bulletin* 175, pp. 1-9.
Arthur B. Williams, "Unconventional Active Filters", *Active Filter Design,* 1975, pp. 93, 95, 97, 99, 100.

*Primary Examiner*—Paul L. Gensler
*Attorney, Agent, or Firm*—Bruce C. Lutz; Howard R. Greenberg; H. Fredrick Hamann

[57] ABSTRACT

A split phase delay equalizer is constructed using a single transformer. An adjustment for Q loss is provided by a flat loss shift in the amplitude response of the equalizer down to a level at or below the lowest Q loss dip level.

3 Claims, 3 Drawing Figures

SPLIT PHASE DELAY EQUALIZER WITH SINGLE TRANSFORMER AND ADJUSTMENT FOR Q LOSS

TECHNICAL FIELD

The invention relates to delay equalizers used to compensate for unwanted delay variations in filters, telephone lines, microwave radio links, and other equipment used for signal transmission. The invention particularly relates to delay equalizers of the split phase type.

BACKGROUND

Delay equalizers are well known in the art, and generally provide an increased delay at or around a resonant frequency at which a filter or the like exhibits a reduced delay, to compensate the latter. Delay equalizers of the split phase type are known, and encompass numerous configurations. One type of split phase delay equalizer using transformers is that shown in an article entitled "IF Variable Equalizers For FM Microwave Radio Links", Shiki et al, IEEE Transactions on Communications, Vol. Com -22, No. 7, July 1974, pp. 941-950. This equalizer is characterized as a reflection type delay equalizer and uses a pair of transformers.

SUMMARY

The present invention provides an improved split phase delay equalizer which is particularly simple and economical. The equalizer uses a single transformer. The equalizer further provides an adjustment shift for parasitic resistive dissipation, Q loss, of an inductor in a series LC reactance network.

DETAILED DESCRIPTION

Figure 1:
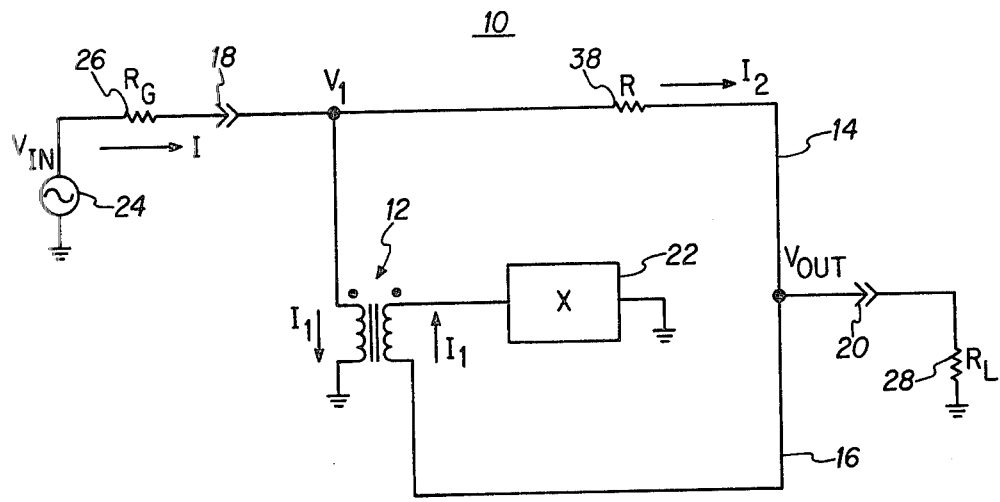
FIG. 1 is a circuit diagram showing a split phase delay equalizer constructed in accordance with the invention.

There is shown in FIG. 1 a split phase delay equalizer, generally designated 10, using a single transformer 12. The equalizer has a pair of circuit branches 14 and 16 connected in parallel between an input 18 and an output 20. Transformer 12 is in one of the branches and provides a 180 degree phase inversion of the signal in that branch. A reactance network 22 is in one of the branches and provides a phase shift of the signal in that branch around the resonant frequency of network 22.

A signal generator 24 delivers a signal through generator impedance 26, having a value $R_G$, to input 18. Reactance network 22, having a value X, may be in the same or opposite circuit branch as transformer 12. The signals from circuit branches 14 and 16 are combined at output 20 and delivered through load impedance 28 having a value $R_L$.

In FIG. 1, single transformer 12 in circuit branch 16 provides 180 degree phase inversion of the signal in branch 16 relative to the signal in branch 14. Circuit branch 16 also includes reactance network 22 which further phase shifts the signal in branch 16 relative to the signal in branch 14. This phase shift occurs around the resonant frequency of network 22, to provide an increased delay. The signal in branch 16 is combined with the signal in branch 14 across load resistor 28 to provide a composite signal whose level is the same (except for Q losses) at all frequencies but whose delay varies with frequency. This increased delay may be used to compensate the reduced delay of a filter or other device at a given frequency.

Figure 2:
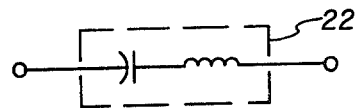
FIG. 2 shows a series LC circuit for the reactance network of FIG. 1.

In preferred form, reactance network 22 is a series LC circuit as shown in FIG. 2. This series LC circuit has an equivalent series resistance $R_Q$ primarily due to inductor parasitic dissipation loss. This is commonly called component Q loss.

Figure 3:
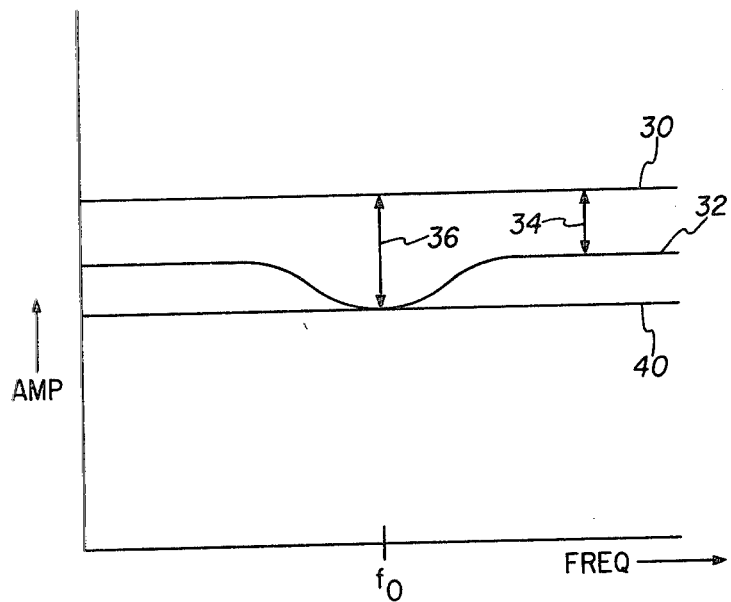
FIG. 3 is a graph of frequency versus amplitude and illustrates the adjustment for Q loss provided by the circuit of FIG. 1.

FIG. 3 plots amplitude versus frequency. Straight horizontal line 30 illustrates the amplitude response of a circuit having equal end termination impedances and no loss therebetween. As an example, setting $R_G$ equal to $R_L$ (e.g., 50 ohms) and eliminating the equalization circuitry between input 18 and output 20 and providing a loss-less connection therebetween would yield the amplitude response shown by 30. If the techniques described herein are not used, the equalization circuitry between input 18 and output 20 yields the curve 32 using prior art equalization techniques where a flat loss 34 is obtained for out-of-band or non-resonant frequencies and a larger dip loss 36 is obtained around the resonant frequency $f_o$ of reactance network 22.

The present invention overcomes the deficiencies of prior art approaches and provides a compensating adjustment for Q loss by effecting a flat loss shift in amplitude response of the equalizer down to a level 40 at or below the lowest Q loss dip level. This is done by calibrating a resistance 38 in circuit branch 14 to a value:

$$R = R_Q + \sqrt{R_Q^2 + 4R_G R_L + 2R_Q(R_G + R_L)} \tag{1}$$

more fully described hereinafter. $R_Q$ is the series resistance due to parasitic resistive dissipation Q loss. Equalizer 10 then yields the amplitude response designated 40 in FIG. 3, whereby to eliminate the variation dip around frequency $f_o$.

Equations (2) through (5) show the loop equations for the circuit of FIG. 1.

$$V_{in} = IR_G + I_2 R + (I_2 - I_1)R_L \tag{2}$$

$$V_{in} = IR_G + V_1 = IR_G + I_1 X + (I_1 - I_2)R_L \tag{3}$$

$$V_{out} = R_L(I_2 - I_1) \tag{4}$$

$$I = I_1 + I_2 \tag{5}$$

$V_{in}$ is the generator potential, or input voltage. $V_1$ is the voltage at input 18. $V_{out}$ is the output voltage at output 20. The currents are as shown in FIG. 1.

Substituting equation (5) into equation (2) yields equation (6).

$$V_{in} = I_2(R_G + R + R_L) + I_1(R_G - R_L) \tag{6}$$

Substituting equation (5) into equation (3) yields equation (7).

$$V_{in} = I_2(R_G - R_L) + I_1(R_G + X + R_L) \tag{7}$$

Rearranging equation (4) yields equation (8).

$$I_2 = \frac{V_{out} + I_1 R_L}{R_L} \quad (8)$$

Substituting equation (8) into equation (6) yields equation (9).

$$V_{in} = \left(\frac{V_{out}}{R_L} + I_1\right)(R_G + R + R_L) + I_1(R_G - R_L) \quad (9)$$

$$= \frac{V_{out}}{R_L}(R_G + R + R_L) + I_1(2R_G + R)$$

Substituting equation (8) into equation (7) yields equation (10).

$$V_{in} = \left(\frac{V_{out}}{R_L} + I_1\right)(R_G - R_L) + I_1(R_G + X + R_L) \quad (10)$$

$$= \frac{V_{out}}{R_L}(R_G - R_L) + I_1(2R_G + X)$$

Rearranging equation (10) yields equation (11).

$$I_1 = \frac{V_{in} - \frac{V_{out}}{R_L}(R_G - R_L)}{2R_G + X} \quad (11)$$

Substituting equation (11) into equation (9) yields equation (12).

$$V_{in} = \frac{V_{out}}{R_L}(R_G + R + R_L) + (2R_G + R) \quad (12)$$

$$\left[\frac{V_{in} - \frac{V_{out}}{R_L}(R_G - R_L)}{2R_G + X}\right]$$

Reducing equation (12) and solving for $V_{out}$ divided by $V_{in}$ yields equations (13) through (18).

$$V_{in}\left(1 - \frac{2R_G + R}{2R_G + X}\right) = \frac{V_{out}}{R_L} \quad (13)$$

$$\left[(R_G + R + R_L) - \frac{(2R_G + R)(R_G - R_L)}{2R_G + X}\right]$$

$$V_{in}(X - R) = \frac{V_{out}}{R_L}[(2R_G + X)(R_G + R - R_L) - \quad (14)$$

$$2R_G^2 + 2R_GR_L - RR_G + RR_L]$$

$$T = \frac{V_{out}}{V_{in}} = \quad (15)$$

$$\frac{R_L(X - R)}{2R_G^2 + 2RR_G + 2R_LR_G + XR_G + XR_L - 2R_G^2 + 2R_GR_L}$$

$$\overline{-RR_G + RR_L}$$

$$T = \frac{V_{out}}{V_{in}} = \frac{R_L(X - R)}{X(R_G + R + R_L) + 4R_GR_L + RR_L + RR_G} \quad (16)$$

$$T = \frac{V_{out}}{V_{in}} = \quad (17)$$

$$\frac{X - R}{X\left(\frac{R_G + R + R_L}{R_L}\right) + \frac{4R_GR_L + RR_L + RR_G}{R_L}}$$

$$T = \frac{V_{out}}{V_{in}} = \quad (18)$$

$$\frac{X - R}{\left(\frac{R_G + R + R_L}{R_L}\right)\left(X + \frac{4R_GR_L + RR_L + RR_G}{R_G + R + R_L}\right)}$$

Equation (18) represents the transfer function of the circuit of FIG. 1, i.e., the ratio of the output voltage to the input voltage.

Equation (18) will now be compared against the transfer function for an ideal circuit with lossless components. Equation (19) shows a generalized ideal transfer function.

$$T_i = \frac{X_i - R}{A(X_i + R_f)} \quad (19)$$

In this generalized ideal transfer function, $X_i$ is pure reactance in the reactance arm circuit branch, R is the resistance in the real arm circuit branch, $R_f$ is some function of R and the generator and load impedances, and A is the flat loss. Comparing equation (18) against the general form in equation (19), it is seen that the values of A and $R_f$ for the circuit of FIG. 1 are given by equations (20) and (21).

$$A = \frac{R_G + R + R_L}{R_L} \quad (20)$$

$$R_f = \frac{4R_GR_L + RR_L + RR_G}{R_G + R + R_L} \quad (21)$$

The all-pass condition for the general idealized case, equation (19), is met when $R = R_f$. The idealized all-pass condition for the circuit of FIG. 1 is thus satisfied when $R = R_f$. Substituting the value of $R_f$ from equation (21) yields equation (22).

$$R = R_f = \frac{4R_GR_L + RR_L + RR_G}{R + R_G + R_L} \quad (22)$$

In the real world, of course, there are deviations from the ideal transfer function, equation (19). Instead of a pure reactance $X_i$, assume there is some resistance in series with the reactance. One form of this series resistance would be a series LC pair with the inductor Q loss the dominant factor. This is a real world condition commonly encountered. In the following description, the inductor Q loss is assumed to have the form of a series resistance, which is a good approximation to reality. Under this assumption, the actual real world reactance X will be equal to the ideal reactance $X_i$ minus a series resistance $R_Q$ due to inductor Q loss, i.e., parasitic resistive dissipation.

$$X = X_i - R_Q \quad (23)$$

The condition shown by equation (23) effectively alters the form of equation (19), and the earlier requirements for the all-pass condition, $R=R_f$, is no longer true.

R must now be set to a different value, one which will account for the introduction of $R_Q$. Rewriting the transfer function in equation (19) to account for Q loss yields equation (24).

$$T_Q = \frac{(X + R_Q) - R}{A[(X + R_Q) + R_f]} \quad (24)$$

Equation (24) is obtained by substituting equation (23) into equation (19). The all-pass condition of the generalized transfer function in equation (19) requires that $R=R_f$. Equation (25) shows a rearrangement of equation (24) to a form which is analogous to the general form of equation (19), to facilitate comparison and recognition of the all-pass condition for $T_Q$.

$$T_Q = \frac{X - (R - R_Q)}{A[X + (R_f + R_Q)]} \quad (25)$$

It is thus seen that the all-pass condition for equation (25) is satisfied when:

$$R - R_Q = R_f + R_Q. \quad (26)$$

This is comparable to the all-pass condition $R=R_f$ for equation (19). Rearranging equation (26) yields equation (27).

$$R_f = R - 2R_Q \quad (27)$$

Equation (21) defines $R_f$ for the circuit in FIG. 1. Substituting equation (27) into equation (21) yields equation (28).

$$R - 2R_Q = \frac{4 R_G R_L + R(R_L + R_G)}{R + (R_L + R_G)} \quad (28)$$

Rearranging and reducing equation (28) yields equations (29) and (30).

$$R^2 + R(R_L + R_G) - 2RR_Q - 2R_Q(R_L + R_G) = 4R_GR_L \quad (29)$$
$$+ R(R_L + R_G)$$

$$R^2 - 2RR_Q - 2R_Q(R_L + R_G) - 4R_GR_L = 0 \quad (30)$$

Solving equation (30) for R using the quadratic equation yields equation (31).

$$R = \frac{2R_Q}{2} \pm \frac{1}{2}\sqrt{4R_Q^2 + 4[2R_Q(R_L + R_G) + 4R_GR_L]} \quad (31)$$

Rearranging equation (31) yields equation (32).

$$R = R_Q \pm \sqrt{R_Q^2 + 4R_GR_L + 2R_Q(R_L + R_G)}$$

If $R_G$ and $R_L$ have positive values, as will be the real world case, then R will have a positive value if the plus (+) sign in equation (32) is used. This results in equation (1) above.

It is recognized that various modifications are possible within the scope of the appended claims.

I claim:

1. A split phase delay equalizer using a single transformer, comprising:

a pair of circuit branches connected in parallel between an input and an output;

first resistance means $R_g$ forming an input impedance to said circuit branches and connected to the input of same;

second resistance means $R_L$ forming an output impedance of said circuit branches and connected to the output of same;

a transformer in one of said circuit branches for providing a 180 degree phase inversion of the signal in that branch;

reactance means in a first one of said pair of circuit branches for providing a phase shift of the signal in that branch; and resistance means only, in the other one of said pair of circuit branches, having a resistance value selected to provide an adjustment shift for Q loss by providing a flat loss shift in amplitude response to eliminate Q loss dip in the latter around the resonant frequency of said reactance means, said reactance means being a series LC network with an equivalent series resistance $R_Q$ due to inductor Q, and wherein said resistance means has a resistance value R, $$R = R_Q + \sqrt{R_Q^2 + 4R_GR_L + 2R_Q(R_G + R_L)}$$

where $R_G$ and $R_L$ are resistance values in said input and output, respectively.

2. A split phase delay equalizer comprising in combination:

a pair of circuit branches connected in parallel between an input and an output;

means providing a 180 degree phase differential between the signals in said circuit branches;

reactance means in one of said circuit branches for providing a phase shift of the signal in that branch; and resistance means only in the circuit branch opposite said reactance means, said resistance means connected in series between said input and said output and adjusted to shift the flat loss in the amplitude response of said equalizer down to a level at or below the lowest Q loss dip level around the resonant frequency of said resistance means, to provide adjustment for Q loss by eliminating said dip.

3. The invention according to claim 2 wherein said first mentioned means comprises a single transformer in one of said circuit branches.

* * * * *